US006591973B2

(12) United States Patent
Smith

(10) Patent No.: US 6,591,973 B2
(45) Date of Patent: Jul. 15, 2003

(54) SIDEBOARD ASSEMBLY FOR WASTE PROCESSING MACHINE

(76) Inventor: Leward N. Smith, Rte. 11, Box 3650, Lake City, FL (US) 32024

( * ) Notice: Subject to any disclaimer, the term of this patent is extended or adjusted under 35 U.S.C. 154(b) by 0 days.

(21) Appl. No.: 09/873,914
(22) Filed: Jun. 4, 2001

(65) Prior Publication Data

US 2002/0179415 A1 Dec. 5, 2002

(51) Int. Cl.[7] ........................................ B65G 65/34
(52) U.S. Cl. ........................ 198/550.2; 198/836.3
(58) Field of Search ........................ 198/311, 550.2, 198/550.13, 836.3

(56) References Cited

U.S. PATENT DOCUMENTS 190,675 A 5/1877 Gaines
589,236 A 8/1897 Williams
604,283 A 5/1898 Albrecht
787,290 A 4/1905 Griffin
1,266,894 A 5/1918 Williams
1,761,083 A 5/1925 Liggett
1,559,924 A 11/1925 Willcox
1,713,507 A 5/1929 Ammon
1,752,290 A 4/1930 Ammon
1,860,519 A * 5/1932 Wickersham ............ 198/836.3
1,889,129 A 11/1932 Nielsen
2,026,790 A 1/1936 Mankoff
2,128,194 A 8/1938 Sheldon et al.
2,244,577 A 6/1941 Schreiber
2,318,219 A 5/1943 Harris
2,392,958 A 1/1946 Tice ............................ 241/55
2,663,505 A 12/1953 Sennholtz ................... 241/197
2,705,596 A 4/1955 Poyser
2,710,635 A 6/1955 Alexander .................. 144/162
2,863,476 A 12/1958 Clark ......................... 144/172
2,864,420 A 12/1958 Schmidt ..................... 146/106
2,900,069 A * 8/1959 Manns et al. ............... 198/311
3,035,682 A * 5/1962 Ferch ....................... 198/550.2
3,194,543 A 7/1965 McIlvaine
3,203,532 A * 8/1965 Mimnaugh et al. ...... 198/550.2
3,254,687 A 6/1966 Tertyshnikov ............... 146/79
3,367,585 A 2/1968 Ratkowski .................. 241/197
3,436,028 A 4/1969 Koehnen et al. ............ 241/186
3,509,924 A 5/1970 Newhouse, Jr. ............ 146/70.1
3,642,214 A 2/1972 Blackwell, Jr. ............. 241/191
3,844,494 A 10/1974 Hightower .................. 241/197
3,907,016 A 9/1975 Nicholson et al. .......... 144/172
4,000,859 A 1/1977 Whitney
4,074,594 A 2/1978 Dall et al. .................... 76/101
4,076,177 A 2/1978 Hirayama et al.

(List continued on next page.)

OTHER PUBLICATIONS

Wood Waste Disposal Problems: Bandit Has Some Answers!, Bandit Industries, Inc. Hard Hat News, Oct. 22, 1993.
The Beast, Model 30 Grinding Yard Waste, Model 15, Grinding Housing Demolition, Waste Handling Equipment News, Sep. 1994.
Bandit's Beast Maintains Nature's Beauty, Construction Equipment Guide, Jun. 1, 1994.
Bandit Industries, Inc., Reader Card 218, Forest Publications, Timber West, Nov. 1993.
Bandit Industries' Model 15–H Beast Recycler, Forest Products Equipment, Aug. 1994.

(List continued on next page.)

*Primary Examiner*—Joseph E. Valenza
(74) *Attorney, Agent, or Firm*—Bliss McGlynn, P.C.

(57) ABSTRACT

A sideboard assembly for an infeed system of a waste processing machine includes a sideboard for attachment to a sidewall of the infeed system of the waste processing machine. The sideboard assembly also includes a plurality of fasteners for removably attaching the sideboard to the sidewall of the infeed system of the waste processing machine.

18 Claims, 2 Drawing Sheets

U.S. PATENT DOCUMENTS 4,077,450 A 3/1978 Ackerman .................. 144/172
4,077,573 A 3/1978 Kersey et al.
4,117,985 A 10/1978 Lazareck .................... 241/197
4,129,260 A 12/1978 Baker .......................... 241/46
4,129,262 A 12/1978 Lowry
4,146,184 A 3/1979 Whitney
4,146,185 A 3/1979 Schober
4,162,769 A 7/1979 Lapointe ...................... 241/68
4,162,770 A 7/1979 Lewis
4,168,035 A 9/1979 Palm et al. ................... 241/81
4,344,581 A 8/1982 Redemann
4,504,019 A 3/1985 Newell et al.
4,558,826 A 12/1985 Martinek
4,573,643 A 3/1986 Orphall et al.
4,688,731 A 8/1987 Hunt et al.
4,702,424 A 10/1987 Widlak .................... 241/101.7
4,717,083 A 1/1988 Quast et al. ................ 241/197
4,848,681 A 7/1989 Eriksson et al.
4,850,406 A 7/1989 Krautzberger .............. 144/230
4,872,500 A 10/1989 Duffey et al. ................. 164/34
4,915,310 A 4/1990 Stelk .......................... 241/197
4,917,314 A 4/1990 Manschwetus .............. 241/194
4,922,977 A 5/1990 Colton et al. ............... 144/230
4,967,969 A 11/1990 Griffith, III .................. 241/93
4,982,904 A 1/1991 Greiner ....................... 241/73
5,002,233 A 3/1991 Williams
5,042,727 A 8/1991 Plante ..................... 241/101.7
5,044,567 A 9/1991 Hte et al. ..................... 241/73
5,078,328 A 1/1992 Willingham
5,114,085 A 5/1992 Inui ........................... 241/195
5,205,496 A 4/1993 O'Donnell et al. ........... 241/34
5,209,278 A 5/1993 Carpenter et al. .......... 144/230
5,285,974 A 2/1994 Cesarini
5,372,316 A 12/1994 Bateman
5,377,919 A 1/1995 Rogers et al.
5,392,999 A 2/1995 Konig et al.
5,404,993 A * 4/1995 Scarrow .................. 198/550.2
5,413,286 A 5/1995 Bateman ..................... 241/190
5,435,689 A * 7/1995 Stonehouse .............. 198/836.3
5,474,239 A 12/1995 Williams, Jr. et al.
5,507,441 A 4/1996 De Boef et al.
5,526,988 A 6/1996 Rine
5,529,249 A 6/1996 Braun et al.
5,611,496 A 3/1997 Fleenor
4,060,961 A 12/1997 Anderson et al.
5,713,525 A 2/1998 Morey
5,743,314 A 4/1998 Puch
5,863,003 A 1/1999 Smith
6,047,912 A 4/2000 Smith
6,059,210 A 5/2000 Smith

OTHER PUBLICATIONS

The Model 15 Beast, Bandit Industries, Inc., MSW Management, Mar./Apr. 1994.

Want to Lower the Cost of Breaking Down Yard and Other Landfill Waste? . . . Try the Beast from Bandit, Resource Recycling, Nov. 1994.

Turn Your Green Waste Into Green Dollars, Bandit Industries, Inc., Sportsturf, 1994.

"Product Release" for the new Model 15–H Beast Recycler Offered by Bandit Industries, Waste Handling Equipment New, Jun. 1994.

For Your Chipping and Grinding Needs, Bandit Industries, Inc., Forest Products Equipment, Aug. 1994.

Megagrind by Rexworks 800, 1995.

How to chop yard waste costs!, 1000 Commercial Grinder, Farmhand.

The Beast, Model 15–H, Bandit Industries, Inc.

The Beast Recyclers from Bandit Industries . . . with Big Appetites for Waste, Bandit Industries.

The Beast—Coming in the Summer of 1993 from Bandit Industries, Inc., Bandit Industries, Inc.

Maxigrind by Rexworks, The Most Versatile Materials Processing Machine.

Industrial Grinder, Big Bite, Manufactured by Haybuster.

* cited by examiner

FIG 2
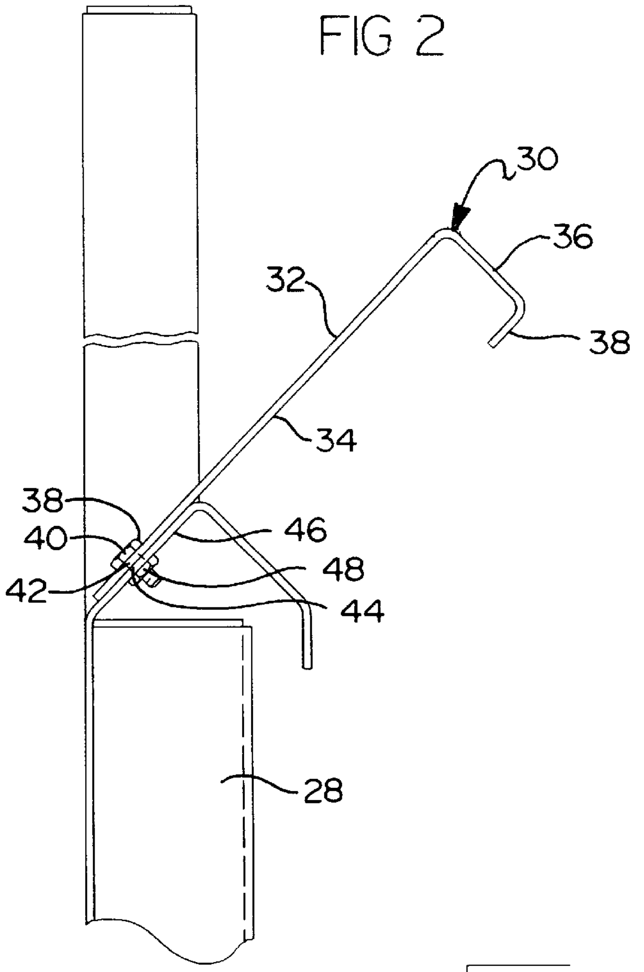
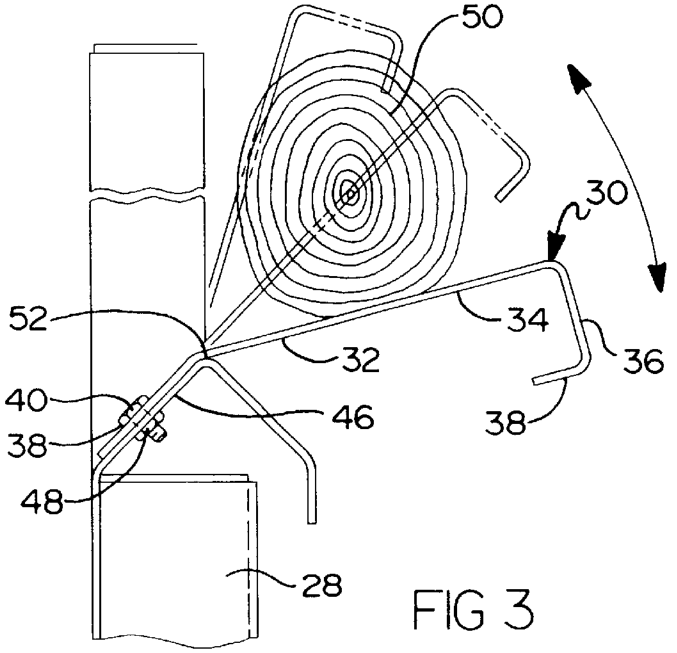
FIG 3

SIDEBOARD ASSEMBLY FOR WASTE PROCESSING MACHINE

BACKGROUND OF THE INVENTION

1. Field of the Invention

The present invention relates generally to waste processing machines and, more particularly, to a sideboard assembly for an infeed system of a waste processing machine.

2. Description of the Related Art

It is known to provide waste processing machines to reduce waste material. The waste processing machine typically includes an infeed system for directing the waste material to a waste reducing system for reducing the waste material. An example of such a waste processing machine is disclosed in U.S. Pat. No. 5,863,003, Issued Jan. 26, 1999, to Smith, entitled "WASTE PROCESSING MACHINE", the disclosure of which is hereby incorporated by reference. In that patent, the infeed system includes an infeed conveyor and a feed wheel assembly. The infeed conveyor has a terminal end spaced a predetermined distance such as one quarter inches (0.25 inches) from a rotor assembly of the waste reducing system. The infeed conveyor is the sole means of support for the waste material and acts as a primary anvil for reducing the waste material by the rotor assembly. Opposed side walls are provided on opposite sides of the conveyor to contain the waste material.

In operation, waste material is placed on the infeed conveyor, which moves the waste material into contact with the feed wheel assembly, which, in turn, rotates and feeds the waste material into contact with the rotor assembly of the waste processing machine. However, the waste material is typically loaded onto the infeed conveyor with a bucket of a front loader. Heavy waste materials such as tree stumps may fall out of the bucket onto the opposed sides of the infeed conveyor. When this occurs, a concentrated weight or load contacts one of the opposed sides, resulting in deformation of the opposed side. Since the opposed sides of the infeed conveyor are fixed and do not bend, the opposed side is bent and permanently deformed. As a result, the entire infeed conveyor must be replaced, which is costly and time consuming.

Therefore, it is desirable to provide an infeed system with sides that allow for bending when contacted by a concentrated load and prevents permanent deformation. It is also desirable to provide opposed sides for an infeed conveyor of an infeed system that are replaceable, if damaged, without replacing the entire infeed conveyor. It is further desirable to provide opposed sides for an infeed conveyor that is relatively inexpensive to replace if damaged and is not time consuming. Therefore, there is a need in the art to provide a sideboard assembly for a waste processing machine that meets these desires.

SUMMARY OF THE INVENTION

It is, therefore, one object of the present invention to provide a sideboard assembly for an infeed system of a waste processing machine.

It is another object of the present invention to provide a sideboard assembly for an infeed system of a waste processing machine that flexes and prevents permanent deformation of the infeed system.

To achieve the foregoing objects, the present invention is a sideboard assembly for an infeed system of a waste processing machine. The sideboard assembly includes a sideboard for attachment to a sidewall of the infeed system of the waste processing machine. The sideboard assembly also includes a plurality of fasteners for removably attaching the sideboard to the sidewall of the infeed system of the waste processing machine.

One advantage of the present invention is that a sideboard assembly is provided for an infeed system of a waste processing machine that acts as a spring to flex and prevent permanent deformation of opposed sides of an infeed conveyor of the waste processing machine. Another advantage of the present invention is that the sideboard assembly allows sideboards attached to opposed sides of an infeed conveyor to bend and not be bent. Yet another advantage of the present invention is that the sideboard assembly allows sideboards attached to opposed sides of an infeed conveyor to be replaced, without replacing the entire infeed conveyor. Still another advantage of the present invention is that the sideboard assembly allows for sideboards, if damaged, to be replaced relatively quickly and inexpensively. A further advantage of the present invention is that the sideboard assembly has sideboards that act as a load distributor when contacted with a concentrated load to prevent permanent deformation of the opposed sides of the infeed conveyor.

Other objects, features, and advantages of the present invention will be readily appreciated, as the same becomes better understood, after reading the subsequent description when considered in connection with the accompanying drawings.

BRIEF DESCRIPTION OF THE DRAWINGS

FIG. 2 is a side elevational view of the sideboard assembly and a portion of the waste processing machine of FIG. 1.

FIG. 3 is a view similar to FIG. 2 of the sideboard assembly and waste processing machine illustrating a concentrated load placed on the sideboard assembly.

DESCRIPTION OF THE PREFERRED EMBODIMENT(S)

Figure 1:
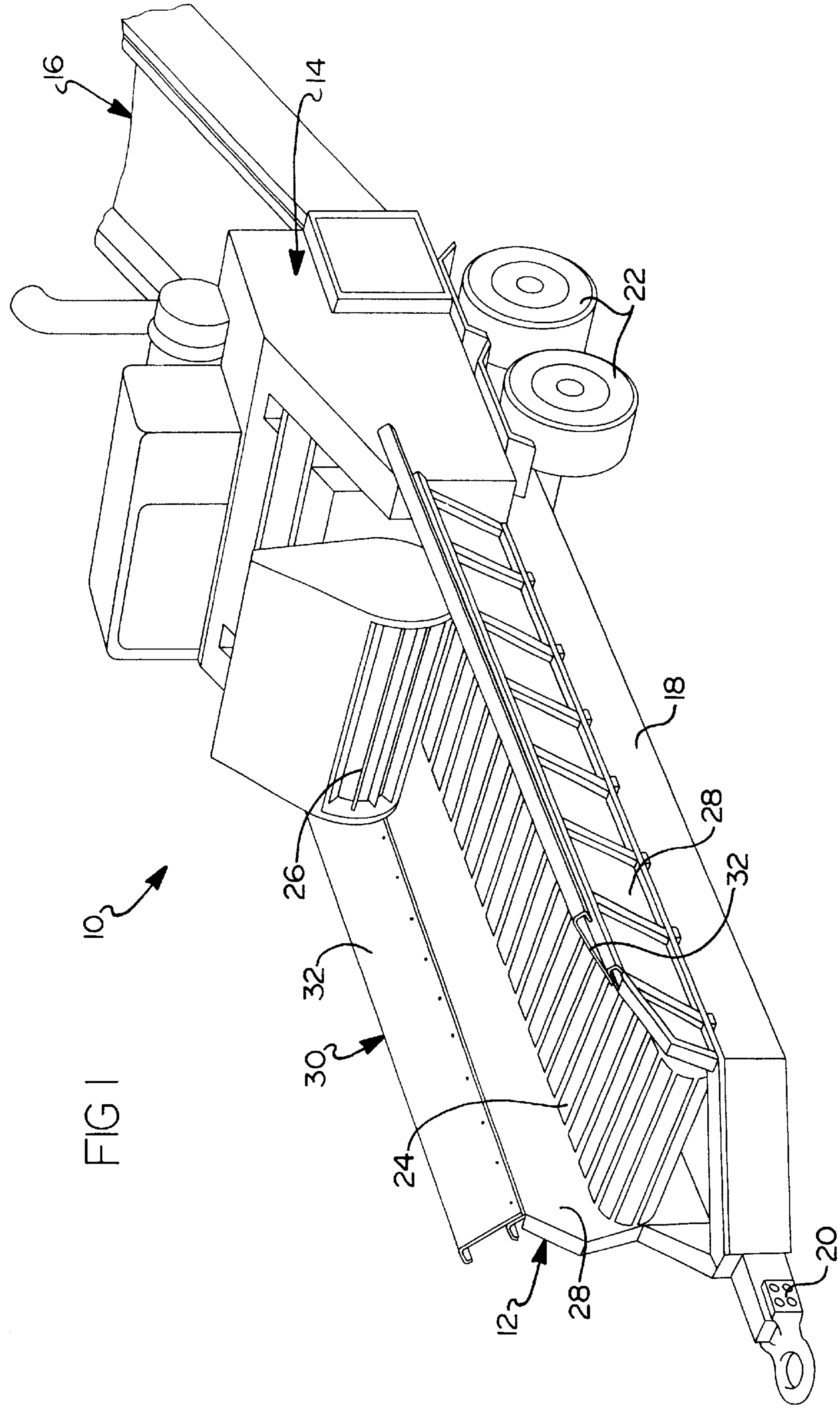
FIG. 1 is a perspective view of a sideboard assembly, according to the present invention, illustrated in operational relationship with a waste processing machine.

Referring now to the drawings and in particular to FIG. 1, one embodiment of a waste processing machine 10 for reducing waste material is shown. The waste processing machine 10 includes an infeed system 12, a waste reducing system 14, and a discharge system 16. Waste material enters the waste processing machine 10 through the infeed system 12 where it is directed to the waste reducing system 14. The waste reducing system 14 reduces the waste material and directs it to the discharge system 16 where the reduced waste material is expelled from the waste processing machine 10. The waste processing machine 10 may be supported on a trailer framework 18 having a tongue mount 20 provided at a front thereof and wheels 22 near a rear of the framework 18. It should be appreciated that, with this structure, the infeed system 12 and waste reducing system 14 can be transported together while the discharge system 16 can be transported separately therefrom.

Referring to FIGS. 1 and 2, the infeed system 12 includes an infeed conveyor 24 and a feed wheel assembly 26. The infeed conveyor 24 has a terminal end (not shown) spaced a predetermined distance such as one quarter inches (0.25 inches) from a rotor assembly (not shown) of the waste reducing system 14. The infeed conveyor 24 is the sole means of support for the waste material and acts as a primary anvil for reducing the waste material by the rotor assembly. The infeed system 12 includes opposed side walls 28 are provided on opposite sides of the infeed conveyor 24 to contain the waste material. It should be appreciated that waste material is placed on the infeed conveyor 24, which moves the waste material into contact with the feed wheel assembly 26, which, in turn, rotates and feeds the waste material into contact with the rotor assembly of the waste reducing system 14.

Referring to FIGS. 1 through 3, the waste processing machine 10 includes a sideboard assembly, generally indicated at 30 and according to the present invention, for the infeed system 12. The sideboard assembly 30 includes a sideboard 32 disposed along each of the opposed side walls 28 of the infeed conveyor 24 at a top thereof. The sideboard 32 is generally planar and rectangular in shape. The sideboard 32 extends longitudinally along the sidewall 28. The sideboard 32 has a base wall 34 extending outwardly beyond the sidewall 28 and a sidewall 34 extending generally perpendicular thereto to form a generally inverted "L" cross-sectional shape. The sideboard 32 also has a flange wall 36 extending inwardly and generally perpendicular to the sidewall 34. The sideboard 32 is made of a metal material such as titanium spring steel. The sideboard 32 is a monolithic structure being integral, unitary, and one-piece. It should be appreciated that the sideboard 32 extends longitudinally a predetermined length such as twenty feet and laterally a predetermined length such as eighteen inches and vertically a predetermined length such as ten inches.

The sideboard assembly 30 also includes a plurality of fasteners 38 for removably fastening the sideboards 32 to the opposed sides 28 of the infeed conveyor 24 of the infeed system 12. The fasteners 38 have a bolt 40 that extends through an aperture 42 in the base wall 34 of the sideboard and a corresponding aperture 44 of a flange or top wall 46 at the top of the opposed side 28. The fasteners 38 also have a nut 48 removably and threadably engaged with the bolt 40 to prevent the bolt 40 from exiting the aperture 42 and 44. It should be appreciated that the apertures 40 and 42 are spaced longitudinally along the base wall 34 and top wall 46. It should also be appreciated that the top wall 46 has a generally inverted "V" shape to locate the sideboard 32 at an angle relative to the sidewall 28 or a longitudinal axis of the infeed conveyor 24. It should be further appreciated that the fasteners 38 are conventional and known in the art.

Referring to FIG. 3, in operation, waste material is loaded onto the infeed system 12, which directs the waste material to the waste reducing system 14 for reducing the waste material. During operation, if a concentrated load of the waste material such as a tree stump 50 contacts the sideboard assembly 30, the sideboard 32 flexes as illustrated from its original position in the phantom lines to a flexed position in the solid lines. The concentrated load of the tree stump 50 contacts the base wall 34 and the base wall 34 bends downwardly along a hinge point 52 because the base wall 34 is fastened by the fasteners 38 to the top wall 46. The sidewall 36 acts as a distributor to distribute the concentrated load along the sidewall 36. The sideboard 32, being made of a spring material, acts similar to a leaf spring and produces a return force that moves the tree stump 50 upwardly and either onto or off of the conveyor 24. The base wall 34 may flex beyond its original position as illustrated in the second phantom lines before returning to its original position. If for some reason the sideboard 32 is bent or permanently deformed, the sideboard 32 may be easily replaced by unfastening the fasteners 38 and installing a new sideboard 32 with the fasteners 38. It should be appreciated that the sideboard assembly 30 acts as a spring beam that supports the concentrated load and prevents permanent deformation of the sidewalls 28 of the infeed conveyor 24.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A sideboard assembly for an infeed system comprising:

a sideboard for attachment to a sidewall of the infeed system, said sideboard being made of spring material and extending upwardly beyond the sidewall of the infeed system to absorb impact of material that would normally strike an upper end of the sidewall when contacted by the material being loaded onto the infeed system; and a plurality of fasteners for removably attaching said sideboard to the sidewall of the infeed system.

2. A sideboard assembly as set forth in claim 1 wherein said sideboard is adapted to extend longitudinally along the sidewall.

3. A sideboard assembly as set forth in claim 1 wherein said sideboard is adapted to be disposed at an angle to the sidewall.

4. A sideboard assembly as set forth in claim 1 wherein said sideboard is adapted to be attached to a top wall of the sidewall.

5. A sideboard assembly as set in claim 4 wherein said fasteners are adapted to be spaced longitudinally along and extend through the top wall of the sidewall.

6. A sideboard assembly as set forth in claim 5 wherein said fasteners comprise a bolt and nut.

7. A sideboard assembly as set forth in claim 1 wherein said sideboard includes a base wall extending longitudinally and upwardly at an angle from said sidewall.

8. A sideboard assembly as set forth in claim 7 said sideboard includes a sidewall extending longitudinally and downwardly at an angle from said base wall.

9. A sideboard assembly as set forth in claim 8 wherein said sideboard includes a flange wall extending longitudinally and generally perpendicular to said sidewall.

10. An infeed system comprising:

an infeed conveyor to convey material;

opposed sidewalls on opposed sides of said infeed conveyor to contain the material on said infeed conveyor; and a sideboard assembly attached to said sidewalls of said infeed conveyor and extending upwardly beyond said sidewalls to flex and absorb impact of the material that would normally strike an upper end of said sidewalls when contacted by the material being loaded onto said infeed conveyor.

11. An infeed system as set forth in claim 10 wherein said sideboard assembly comprises a sideboard attached to each one of said sidewalls.

12. An infeed system as set forth in claim 11 wherein said sideboard assembly includes a plurality of fasteners for removably attaching said sideboard to said sidewall.

13. An infeed system as set forth in claim 10 wherein said sideboard includes a base wall extending longitudinally and upwardly at an angle from said sidewall.

14. An infeed system as set in claim 13 wherein said sideboard includes a sidewall extending longitudinally and downwardly at an angle from said base wall.

15. An infeed system as set forth in claim 14 wherein said sideboard includes a flange wall extending longitudinally and generally perpendicular to said base wall.

16. An infeed system as set forth in claim 15 wherein said base wall, sidewall, and flange wall are integral, unitary, and one-piece.

17. An infeed system for a waste processing machine comprising:

an infeed conveyor to convey waste material to a waste reducing system of the waste processing machine;

opposed sidewalls on opposed sides of said infeed conveyor to contain the waste material on said infeed conveyor;

a sideboard assembly attached to said sidewalls of said infeed system to flex when contacted by waste material;

said sideboard assembly including a base wall extending longitudinally and upwardly at an angle from each of said sidewalls; and wherein each of said sidewalls have a top wall extending longitudinally and upwardly at an angle, said base wall being secured to said top wall and extending outwardly beyond said top wall.

18. A waste processing machine comprising:

a waste reducing system for reducing waste material;

an infeed system for directing the waste material to said waste reducing system;

said infeed system including an infeed conveyor having opposed sidewalls on opposed sides thereof to contain the waste material on said infeed conveyor; and a sideboard assembly attached to said sidewalls of said infeed conveyor and extending upwardly beyond said sidewalls to act as a spring by absorbing impact of the waste material that would normally strike an upper end of said sidewalls and prevent concentrated loads of the waste material from permanently deforming said sidewalls of the waste processing machine.

* * * * *